Inventor
Franz Puening

Inventor
Franz Puening

Feb. 16, 1943.  F. PUENING  2,311,349
COKE OVEN WITH MOVABLE WALLS
Filed April 19, 1941   10 Sheets-Sheet 9

Feb. 16, 1943.  F. PUENING  2,311,349
COKE OVEN WITH MOVABLE WALLS
Filed April 19, 1941  10 Sheets-Sheet 10

Inventor
Franz Puening.

Patented Feb. 16, 1943

2,311,349

UNITED STATES PATENT OFFICE 2,311,349

COKE OVEN WITH MOVABLE WALLS

Franz Puening, New York, N. Y.

Application April 19, 1941, Serial No. 389,302

26 Claims. (Cl. 202—105)

The present invention relates to the coking of coal and particularly to coking at medium temperatures although low and high temperatures are also within its reach. More particularly it relates to blocks of movable coking walls working with thin coal charges and short coking times as shown in my co-pending application Serial No. 282,785 filed July 4, 1939, patented May 6, 1941, No. 2,240,575, which describes an oven in which each coking chamber, formed between a pair of movable walls, is equipped with individual means for sealing the chamber separately from the atmosphere, there being no enclosure common to the several walls. In this type of oven due to the thinness of the charges the operations of opening, recharging and resealing the chambers must be performed with the greatest speed. For the same reason it is desirable that all chambers of a block are charged and discharged simultaneously. Such simultaneous charging is also important in case of poorly coking coals which can be made to furnish a greatly improved coke, by compacting or densifying the coal directly into the oven chamber. By performing this act of compacting simultaneously in all chambers the pressure exerted by the coal upon the coking walls is neutralized and transferred to the outer walls of the block, which can be reinforced by iron beams, enabling the intermediate walls to carry the pressure of the coal without buckling. A similar advantage is gained in case of swelling coals, where it is the swelling pressure exerted by the coals which is neutralized by simultaneous charging.

It is the object of this invention to provide for ovens of the kind indicated, sealing means of an automatic and permanently gas-tight character, by virtue of which the operating actions required for discharging, recharging and resealing the chambers are reduced to such simplicity and speed that all chambers contained in one block can be charged simultaneously without losses in time and by-products. More specifically it is an object to provide automatically acting continually gas-tight connections between the side seals and the top and bottom seals, to eliminate the painstaking cleaning and scraping of the sealing surfaces which is required in case of older arrangements, and to provide sealing devices which in case of need can be quickly exchanged, without much labor.

The present application has the additional aim to provide sealing means which permit the chambers of a block to be expanded in width for instance from 6" to 7½", while the coking action proceeds, without thereby unsealing the chamber, thus forestalling damage which an excessively swelling coal may otherwise inflict upon the walls.

In order that the nature of the invention may be more clearly appreciated, particular embodiments will now be described with reference to the accompanying drawings, in which.

The arrangement illustrated comprises two coking chambers formed between three movable walls; in practice, however, a greater number of coking chambers would be formed between a plurality of coking walls, each chamber being sealed in the manner about to be described.

Figure 4:
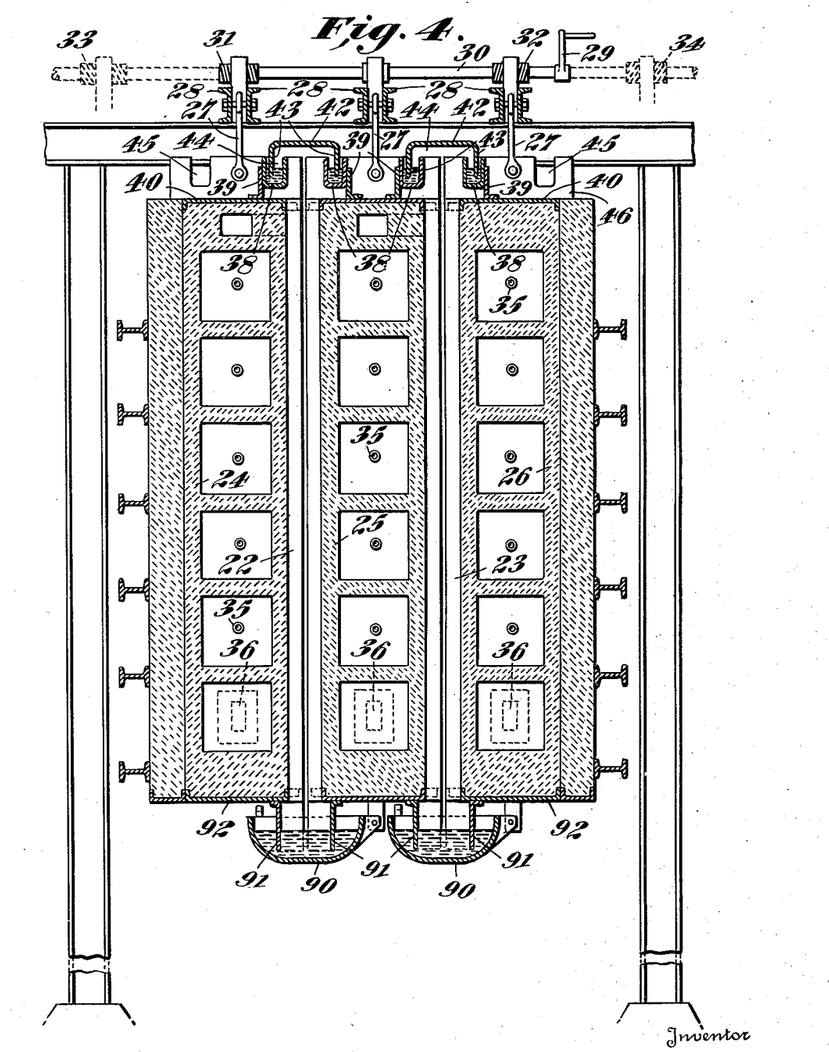
Figure 4 is a section on the line 4—4 of Figure 1.

Coking chambers 22 and 23 Figure 4 are formed between three movable walls 24, 25 and 26, which are suspended by hangers 27 from beams 28 so as to be separable by means of two cranks 29 mounted on shafts 30, each formed with opposite threads 31 and 32. A similar set of spreading screws is preferably provided at the lower end of the walls, and when more chambers than two are provided in one block, then the screw shafts 30 are lengthened and the spreading screws 33 and 34 for the added outer walls receive increased pitch, so that the added walls are moved outwardly for instance two inches while the inner walls 24 and 26 move only one inch, with center wall 25 remaining stationary.

Each wall is heated internally by burners 35. Each wall has an exit flue 36 for waste heat, equipped with flexible or slidable joints 37 permitting motion of the wall.

In order to seal the top opening of each coking chamber 22 and 23 during coking the chamber is surrounded on top by a continuous water filled trough the two longitudinal sections of which 38 are fastened to angles 39 which are fixed upon the top frame plates 40 of the three walls, while the gap between the ends of the longitudinal sections 38 are bridged by U-shaped flexible bridging troughs 41. A removable bell shaped cover 42 is used in cooperation with the continuous trough, dipping with its side skirts 43 into the water filled longitudinal trough sections 38 and dipping with its end skirts 44 into the bridging troughs 41.

The connection between the longitudinal sections 38 and the angles 39 is gastight but permits vertical sliding and a rising of the top frameplate 40 due to heat expansion of the wall. The longitudinal trough sections 38 pass through valleys 45 cut in the upper ends of the side frame plates 46. The horizontal length of these valleys is increased by U-shaped extensions 47 Figures 5 and 7 welded onto the side frame plates. The space between the longitudinal sections and the U-shaped valleys is made gastight by means of packing material 48.

Figure 5:
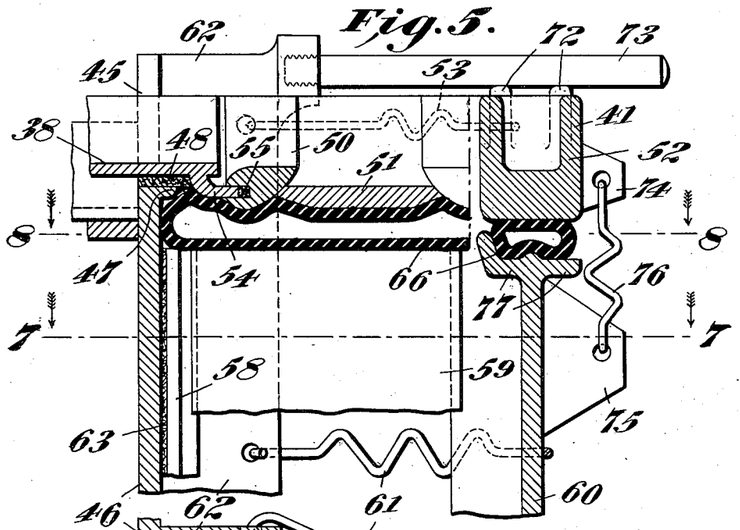
Figure 5 shows in elevation a portion of the top right-hand corner of the wall shown in Figure 1.
Figure 6:
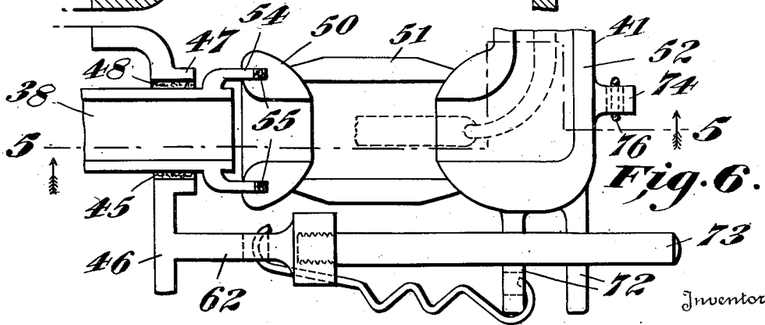
Figure 6 is a plan view of the detail shown in Figure 5.

The bridging troughs 41 in Figures 5 and 6 are composed of metal links 50, 51 and 52 having trough shape and fitting together in the manner of swivel or ball joints as used in flexible piping. The links are pressed into water tight connection with each other and with the longitudinal troughs 38 by means of tension springs 53. Between links 50 and the longitudinal troughs a bell and spigot joint 54 with packing material 55 is provided.

Figure 1:
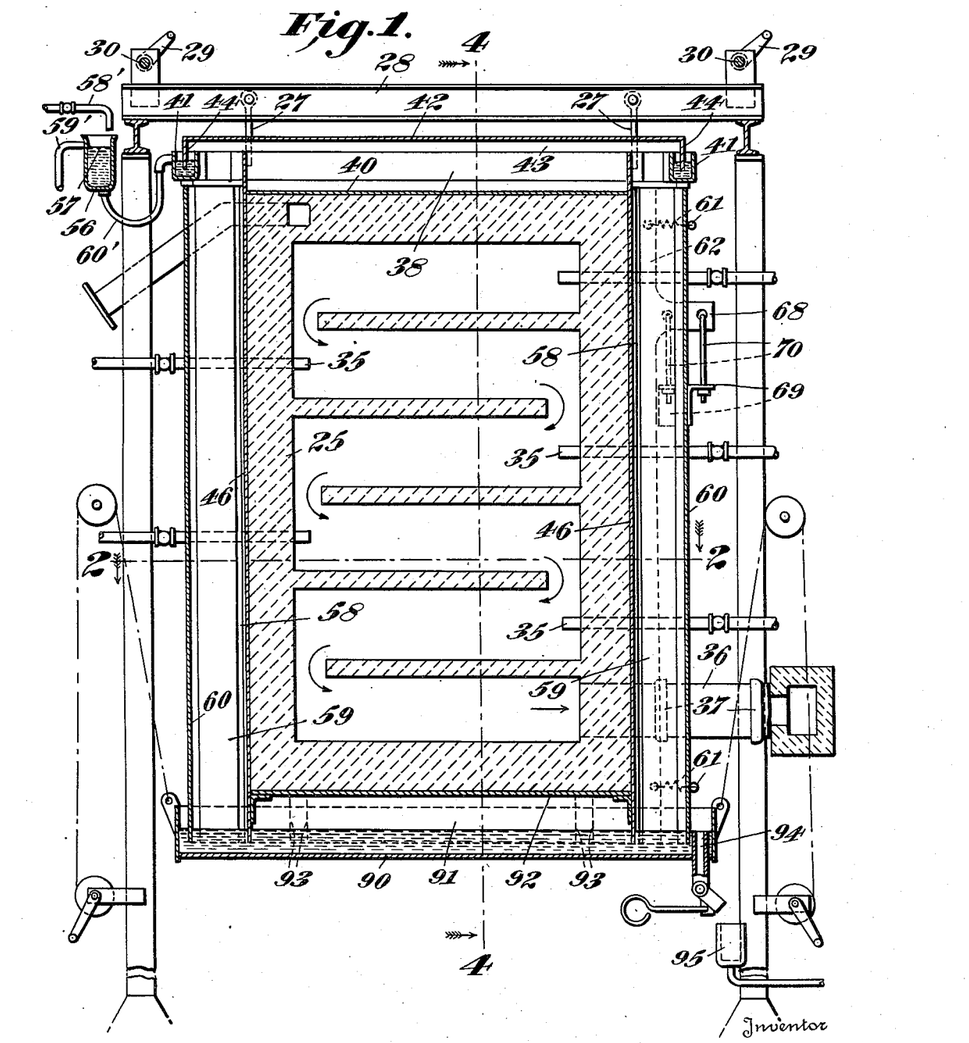
Figure 1 is a sectional elevation taken through a coking oven comprising two coking chambers formed between three coking walls, the section being taken on the line 1—1 of Figure 2.

Referring to Figure 1, water is maintained in reservoir 56 at level 57 by means of supply line 58' and overflow pipe 59', and from the reservoir flows through hose 60' into the bridging trough 41.

Figure 7:
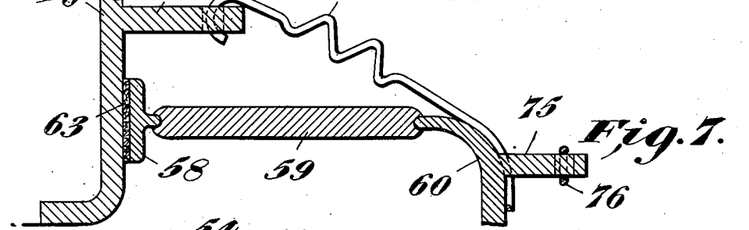
Figure 7 is a section on the line 7—7 of Figure 5.

Figures 5 and 7 show the vertical side edges of adjoining coking walls 25 and 26 which are permanently and flexibly sealed against each other by side-sealing members comprising a plurality of coacting relatively heavy metal members 58, 59 and 60 pressed into continuously gas tight pressure touch with each other and with the side frame plates 46 by means of tension springs 61, which are hooked onto the side frame ribs 62 fastened to frame plates 46. An asbestos gasket 63 is preferably interposed between side frame plate 46 and side sealing member 58, because of the rougher surface of the side frame plate, while gaskets may be omitted between the side sealing members 58 and 60. The use of the springs 61 is advantageous. They press all elements of the side sealing devices upon each other and upon the walls, they permit a vertical sliding of one of the individual sealing members against another if necessary in case of variations in temperature and they can quickly be unhooked and thus expedite repairs if required; they also have the effect of keeping the sealing members centered upon the center of the chambers 22 and 23.

At the point of junction between the vertical side sealing members and the bridging troughs are provided flexible and elastic corner sealing devices which continually maintain gas tightness at this junction. A flexible packing is elastically pressed against the bridging troughs and the side sealing members so that the packing material moves jointly with them, when the walls are moved.

Figure 5 shows the elastic packing to have the form of an inflatable bag 66 interposed between the bridging trough 50—52 and side sealing members 58—60.

Figures 8, 11:
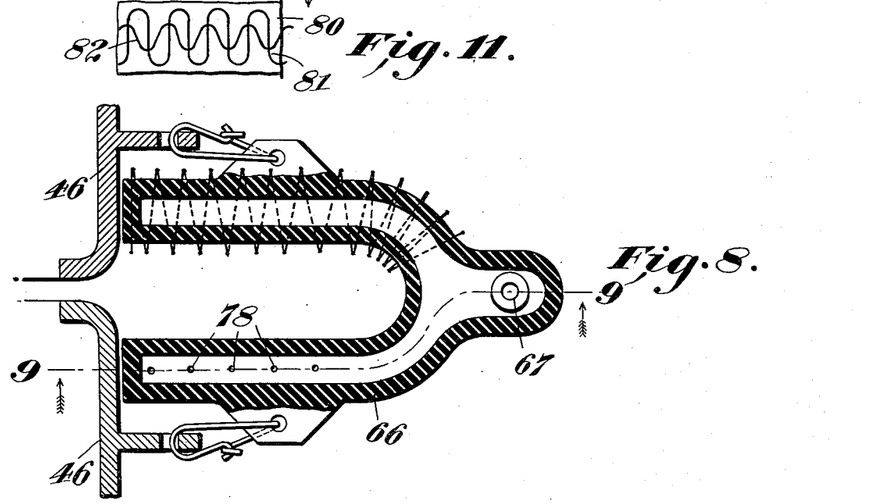
Figure 8 is a section on the line 8—8 of Figure 5.
Figure 11 is a section on the line 11—11 of Figure 10.
Figure 9:
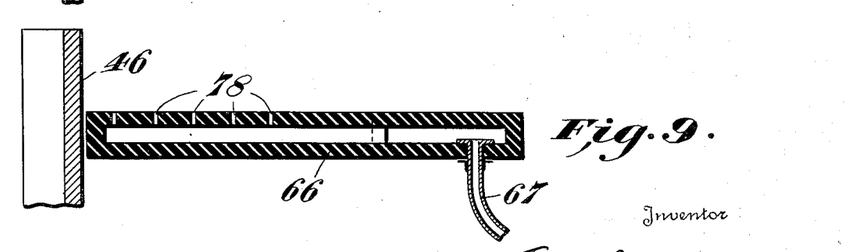
Figure 9 is a sectional elevation on the line 9—9 of Figure 8.

To effect the inflation, a fluid for instance water is pressed into the bag through pipe 67 shown in Figures 8 and 9. The pressure is regulated to create gas-tightness, but a very low pressure is sufficient, in view of the fact that the gas pressure inside the coking chamber is only about one eighth of one inch of water column.

Figure 2:
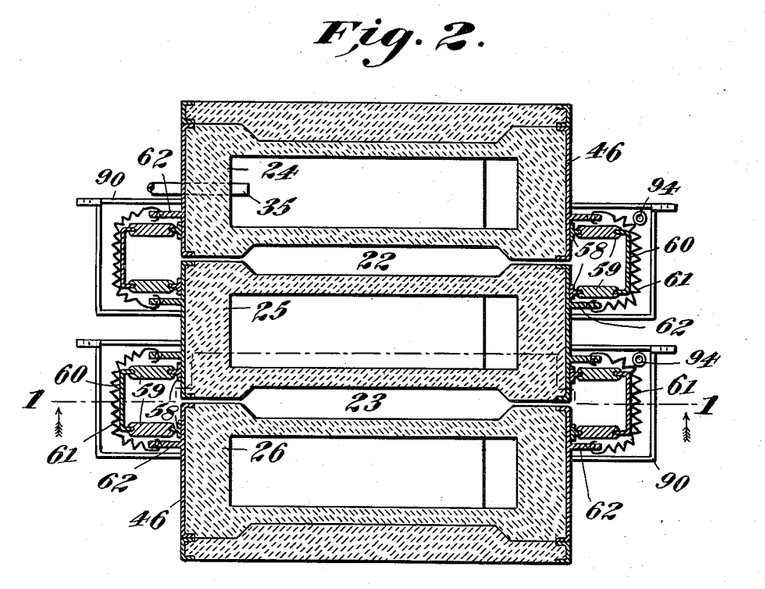
Figure 2 is a section on the line 2—2 of Figure 1.

To maintain the relative position between the bridging troughs and the side sealing members and to enable them to withstand the pressure exerted by the bag, means are provided shown in Figures 1 and 2 consisting of brackets 68 extending from side ribs 62 (Figure 7) and brackets 69 extending from side sealing member 59 and 60, said brackets being connected by adjustable hangers 70, which serve to pull the side sealing members upward into suitable proximity to the bridging troughs above them. Means are also provided for holding the bridging trough down in its position, consisting of ribs 72 cast onto trough member 52 and guiding bolts 73 screwed into side frame ribs 62 attached to side frame plates 46.

Figure 10:
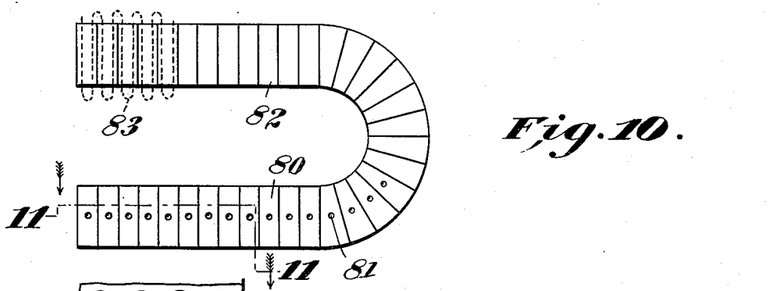
Figure 10 is a plan view of an alternative for the device shown in Figure 8.

Additional means may be provided for holding the bridging troughs and the side members together consisting of brackets 74 and 75 and springs 76. Bag 66 preferably is supported on shoulder sections 77 Figure 5 attached to side sealing members 60 and 59. The bag is kept cool by contact with the water filled bridging troughs and by virtue of the water entering the bag through pipe 67. By providing a second pipe connection of the same type as shown at 67 the water can be circulated through the bag, thus lowering its temperature still more. The bag may be further protected by several layers of various insulating materials, which shield it against heat as well as the action of distillates. The bag may be still further protected by keeping these layers of insulating material wet, for instance by means of perforations 78 Figures 8 and 9 located on the inner edge of the bag, through which water entering through line 67, can be pressed into the insulating layers. Instead of water, low pressure steam or a gas may be used for inflating the bag. The bag can be further protected against heat by making it permeable, so that the water or the steam inside the bag filters through the fabric of the bag. Thus the bag may be made of a material like flax or hemp. In this case the bag may be partially treated with a rubber compound making those portions water tight which face the outside atmosphere, while the portions facing the coal chamber remain untreated so that the fluid in the bag permeates the fabric and supplies a protective vapor on the surfaces exposed to the coal chamber. In some cases depending upon the temperature at which the coking oven is operated it is possible to dispense with the bag and to use a very soft and pliable packing material as shown at 80 in Figures 10 and 11 preferably fastened by thin wires 81 to an elastic corrugated metal skeleton or grid 82 located in the middle of the packing and having horse shoe form as shown in Figure 10 the component strands of the packing running substantially at right angles to the center line of the horseshoe as indicated by lines 83.

Figure 12:
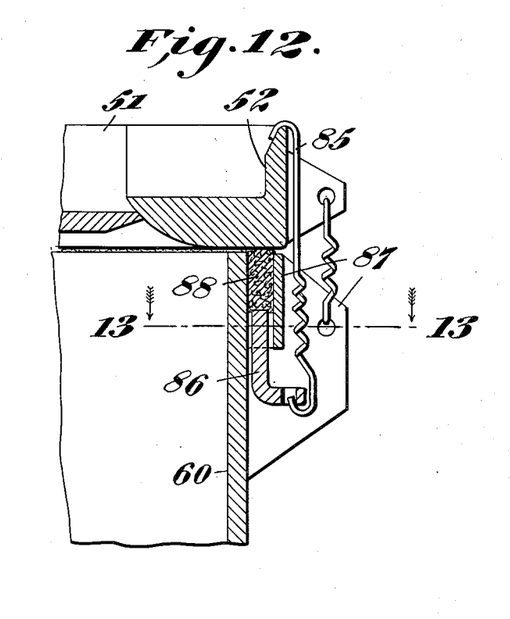
Figure 12 shows in sectional elevation an alternative for the top right-hand corner shown in Figure 5.
Figure 13:
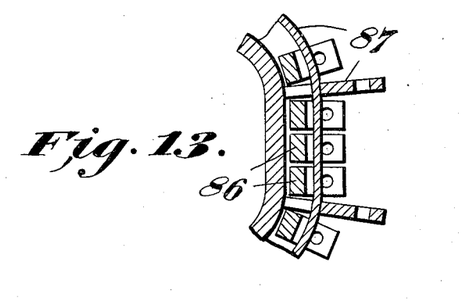
Figure 13 is a section on the line 13—13 of Figure 12.

The pressure upon the corner packing may also be exerted as shown for instance in Figures 12 and 13 by means of metal springs 85, connected to bridging troughs 50, 51 and 52 and to pistons 86 held in position by braces 87, the springs and the pistons forcing the packing material 88 against the bridging troughs 52 and the side sealing members 58, 59 and 60.

The bottom opening of each coking chamber is sealed with the aid of a tub-shaped water filled door 90 shown in Figures 1 and 4 into which dip the bottom skirts 91 of the coking walls and the lowest ends of the side frame plates 46 and of the side seals 58, 59 and 60. The bottom skirts 91 extend laterally till they are in contact with and fixed in gastight manner to the lowest ends of the side frame plates 46. The skirts are attached to bottom frame plates 92 of the walls, so that horizontal sliding is possible and sliding expansion joints 93 are provided in each bottom skirt, so that gastight continuity of the bottom sealing means is assured in spite of heat expansion of the walls.

The tub-door 90 may protrude into the coking chamber or coke-breeze may be filled in on top of the door thus keeping the coal away from the door as it is customary with intermittent vertical ovens; coal gas or steam may also be blown into the coke breeze to keep distillates away. The water which is filled into the bottom tub for the purpose of sealing may be augmented by water from the top trough as will be described later on or by water of condensation from the coal distillates. The bottom door is therefore equipped with an overflow 94 which discharges the surplus into a water collecting manifold 95 leading to a tank not shown.

Figure 14:
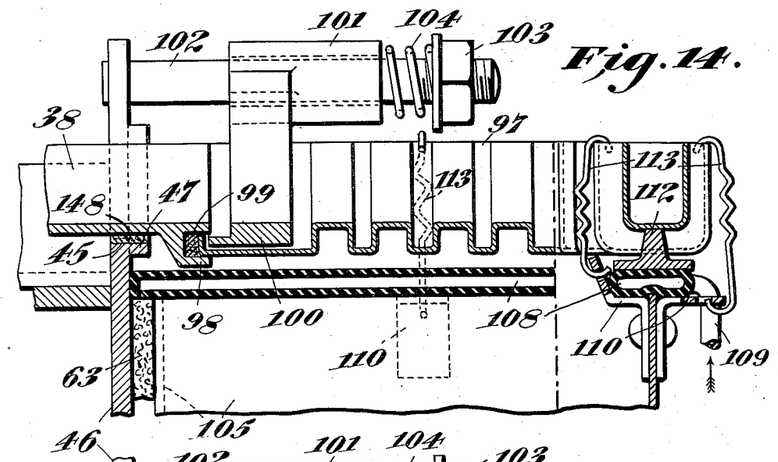
Figure 14 shows in elevation another alternative for the top right-hand corner shown in Figure 5.
Figure 15:
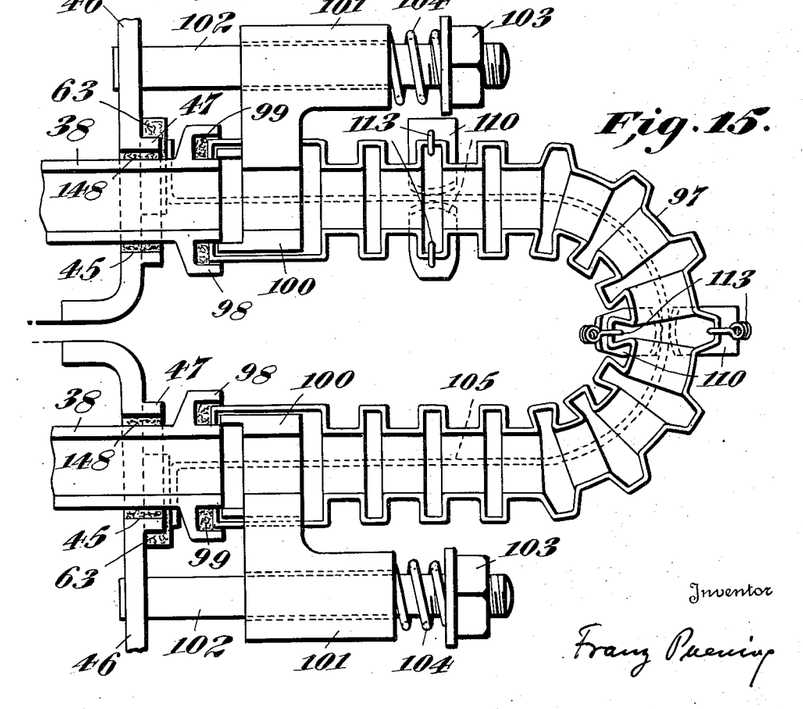
Figure 15 is a plan view of the detail shown in Figure 14.

Instead of composing the bridging troughs and side seals of heavy jointed members they may be made of a material, which is pliable or elastic in itself. Thus the bridging troughs 97 shown in Figures 14 and 15 are made of thin flexible corrugated metal shaped in the form of a trough. The corrugated trough is pressed into watertight contact with longitudinal troughs 38 by means of bell 98 containing packing 99 and plunger 100 carried by bracket 101 centered on bolt 102 and pressed forward by nut 103 and spring 104, the bolt being attached to side frame plate 46. The corrugations provided in the bridging trough may be much more numerous than shown.

Figure 20:
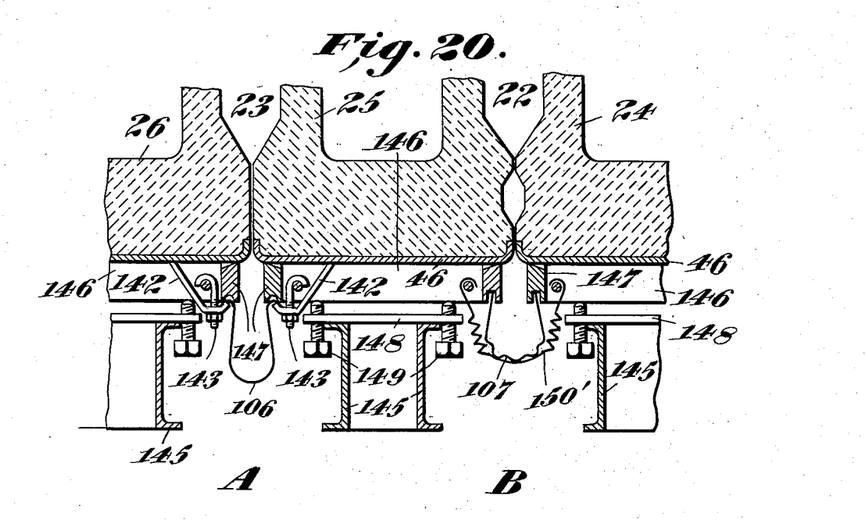
Figure 20 shows in horizontal section side sealing members A and B combined with reinforcing grids.

Instead of composing the flexible side sealing members as shown in Figure 7 of a plurality of coacting heavy metal members they may have the form of a pliable or flexible and corrosion resisting metal diaphragm 105 as shown in Figures 14 and 15 and as shown at 106 and 107 in Figure 20. Gastightness between the corrugated trough 97 and the side diaphragm 105 is established by means of water inflated bag 108 receiving its water pressure through pipe 109, the bag resting on shoulder sections 110 and pressing a serrated gasket 112 into registration with the corrugations of trough 97, springs 113 being provided to counteract the pressure exerted by the bag. Diaphragm 105 is pressed upon the side frame plate 46 by means similar to those shown in Figure 7 consisting of springs 61 side rib 62 and gasket 63, which gasket is also shown in Figures 14 and 15.

Figures 16, 17, 18:
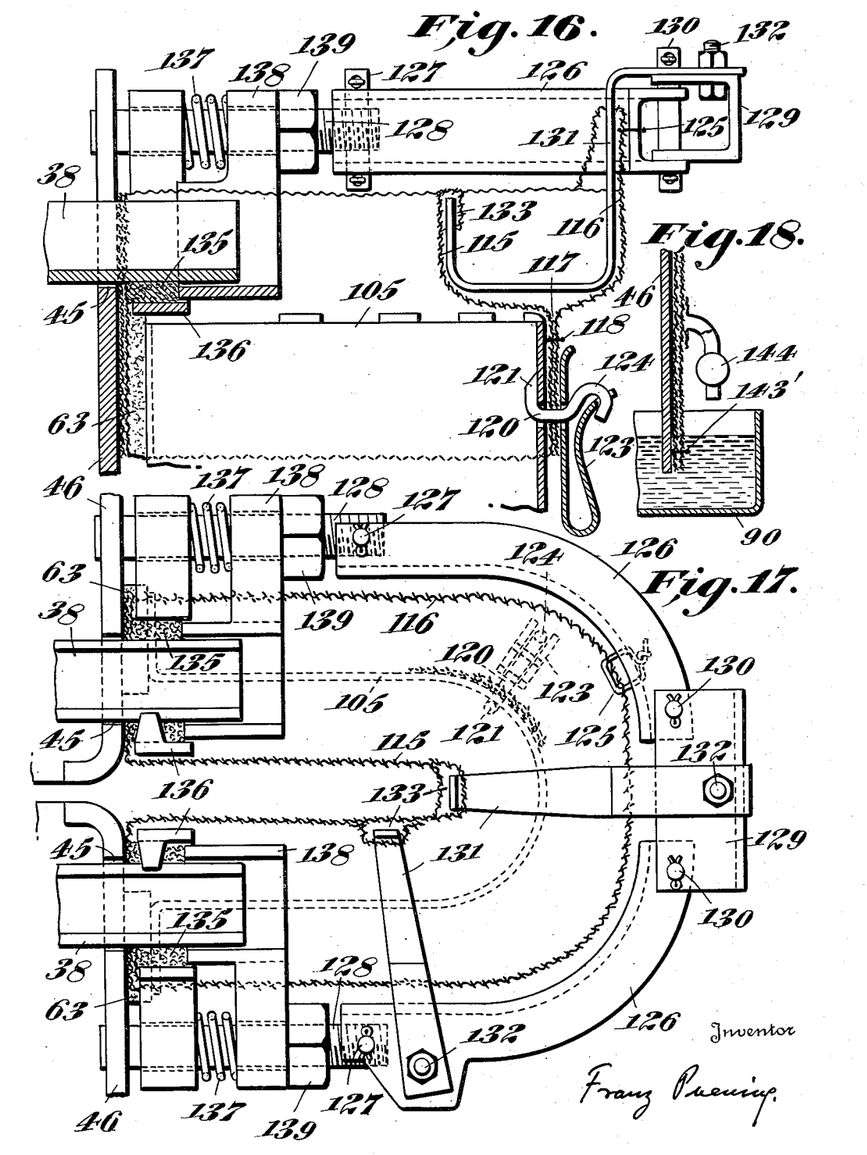
Figure 16 shows in elevation another alternative for the top right-hand corner shown in Figure 5.
Figure 17 is a plan view of the detail shown in Figure 16.
Figure 18 shows in elevation a special lower end of the detail shown in Figure 16.

A special case in the use of pliable material for the construction of the bridging troughs is the use of canvas, shown in Figures 16, 17 and 18. The trough is preferably formed of two sheets 115—116 suitably tailored to run down into an apex 117 where the sheets are sewn together at point 118 to prevent the escape of the water. A flexible metal side sealing diaphragm is shown at 105 against which the lower ends of the two canvas sheets are pressed in gastight manner by means of many S-shaped hooks 120 which penetrate the sheets and the diaphragm and anchor themselves behind the diaphragm by means of anchor 121. A number of springs 123, one of which is shown in its compressed form, pulls on the outer crook 124 of hook 120 and simultaneously presses the canvas against the diaphragm.

The upper edge of the outer sheet 116 is held up in its position at a suitable number of points by being wired at 125 onto a hinged and flexible supporting bridge composed of arms 126 hinged at 127 onto bolts 128 fastened to side frame plates 46, said arms carrying between them connecting piece 129 hinged to arms 126 by means of bolts 130. The upper edge of the inner sheet 115 is held up in position by a number of brackets 131, hinged to the supporting bridge at 132 and ending up in supporting pockets 133 sewn onto the upper edge of inner sheet 115. Sheet 115 may however be supported like sheet 116 using a second bridge.

The canvas trough is pressed in water-tight manner against the side frame plates 46 and simultaneously against the longitudinal top troughs 38 by means of packing material 135, laterally confined by shell 136 centered on bolts 128 and impelled by spring 137 and compressed by plunger 138 also centered on bolts 128 and under pressure of nut 139. Instead of using canvas made of flax or hemp the bridging trough may be made of a porous leather or of rubber compound of a quality resistant to water and tar as it is used in the construction of certain valves. Protective devices as described in connection with bag 66 shown in Figure 5 may also be used.

The canvas sheets 115 and 116 may be continued down over the entire height of the coking walls till they dip into the sealing water contained in the door tub 90 thus using the sheets as side sealing members. In this case the two sheets are not sewn together at 118 but the water in the top trough is permitted to enter the space between the two canvas sheets and to flow down between them into the bottom tub 90. The edges of the sheets are pressed upon the side frame plates 46 in the manner shown in Figure 19 where levers 142 are pressed by bolts 143 hooked onto side ribs 62 are used to press outer sheet 116 and inner sheet 115 and diaphragm 105 upon gasket 63. This continuation of the canvas sheets down into the bottom tub has the advantage, that because of their reliable gastightness, it becomes superfluous to produce gastightness by means of carefully manufactured and tightened metal side sealing members so that these members may be replaced by loosely fitting inexpensive ones.

The canvas sheets which ordinarily are permeable to gas are made gas-tight by virtue of the water which fills the pores of the canvas. The water flowing down between the sheets collects in bottom tub 90, and drains through overflow 94, into manifold 95, whence it reaches a recirculating tank (not shown) in which solid deposits are removed, whereupon the water is pumped back to the supply line 58'. The recirculation tank may be provided with coils for heating or cooling the water and the water may contain antifreezing chemicals and for example, phenol against fungus.

The presence of water in the canvas fabric protects the sheets against becoming too hot. An additional protection against over-heating of the sheets are the diaphragms 105 or their loosely fitting substitutes which may also be insulated.

The quality of the canvas used may be varied, for example in accordance with the height of the oven. A light quality canvas permits an ample filtration of water at pressures of from one to six pounds per square inch, while a heavier sailcloth will stand from thirty to fifty pounds pressure, and fire-hose material up to two hundred pounds or more before an excessive amount of water filters through the cloth. The quality of the canvas employed might, therefore, vary at different heights, the lower parts of the sheets being of denser fabric than the upper parts. Preferably, also, the outer sheet would be denser than the inner.

Figure 19:
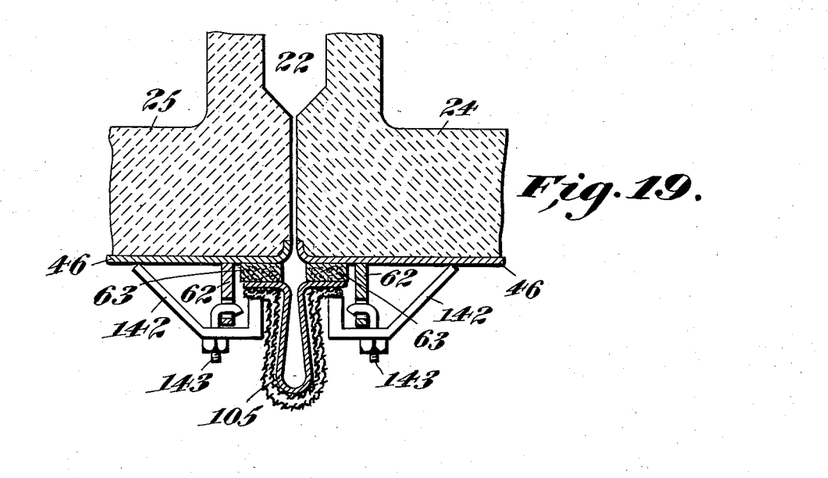
Figure 19 shows in plan view the manner in which the canvas sheets shown in Figure 18 are fastened.

The canvas sheets would preferably be woven together at their edges, thus forming a hose as shown in Figure 19, so that water cannot leave sideways. The sheets are sewn together at their lower end at 143', see Figure 18, and the quantity of water passing down between them is regulated by valve 144.

Figure 3:
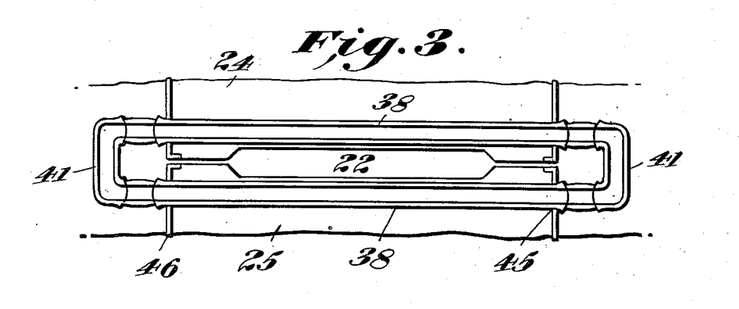
Figure 3 is a plan view of the top trough on line 3—3 of Figure 1 with the cover removed.

The brick walls shown in Figures 1-2-3 are of exceptionally small dimensions. In large walls heavy reinforcing girders are used for the purpose of reinforcing the side frame plates 46 which surrounds the brick walls. In this case a reinforcing grid is preferably interposed between buckstays and side frame plates as shown in Figure 20 which shows brick walls 24—26, the side frame plate 46 and the reinforcing girders 145. A reinforcing grid composed of horizontal bars 146 and vertical bars 147 is interposed between the girder and the side frame plate. The girder is equipped with batten bars 148 which carry screws 149 which press the grid upon the frame plate. When this grid is present the side sealing members may be pressed upon the side grid by levers 142 and bolts 143 as shown in Figure 20A and also in Figure 19 or by means of springs 150' shown in Figure 20B the grid itself being pressed in gastight manner upon frame plate 46.

Figure 21:
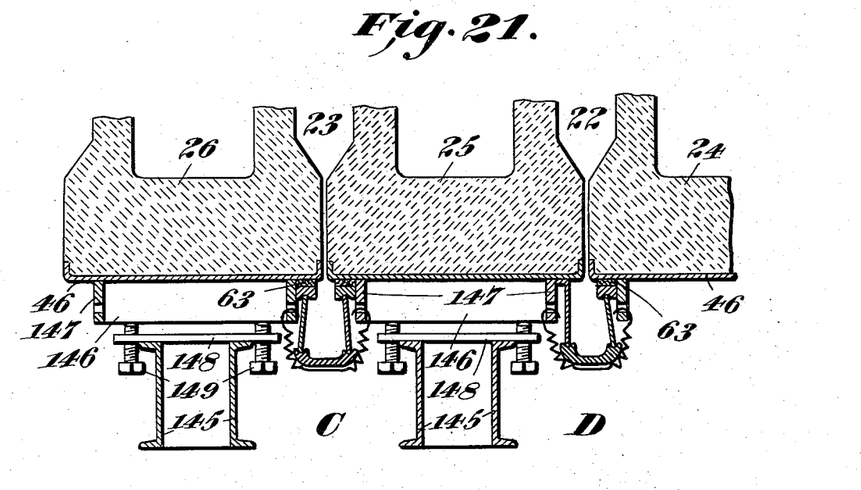
Figure 21 shows in horizontal section alternative side sealing members C and D; and Figure shows in horizontal sectional alternative side sealing members E and F.

The grid bars 147 can also be used for anchoring to them the springs which press the flexible side sealing members upon side frame plate as shown in Figure 21. Similar grids may also be used for reinforcing the top and bottom frame plates. The number of component movable parts forming the side seals may be reduced to two as shown in Figure 21D or even to one as shown in Figures 22E and 22F, the two latter ones permitting a sliding motion.

As has been shown, different forms of flexible side seals, corner sealing devices and bridging troughs are possible and in the claims the words flexible or elastic are intended to cover any movability or alteration in form either by expansion, contraction, flexion, rotation, sliding, telescoping, bending, etc.

The water seals can easily be kept clean. Any dust collecting in the top troughs can be drawn out by a vacuum cleaner tube. This can be done while the coking proceeds. No careful removal of deposits formed on the side seals, for instance by scraping the surfaces metallicly clean is necessary. There is no objection to a layer of limited thickness of tar or coal dust collecting on the surfaces of the flexible sealing members or on other surfaces near them. Only the building up of excessively thick deposits must be prevented, and this is easily done by moving a scraper or brush over these surfaces at times when the walls are spread apart. All surfaces of the side seals to be scraped are vertical and the scrapers can therefore be attached to a vertically movable platform which may form part of the coal charging machinery and which is power operated.

Figure 22:
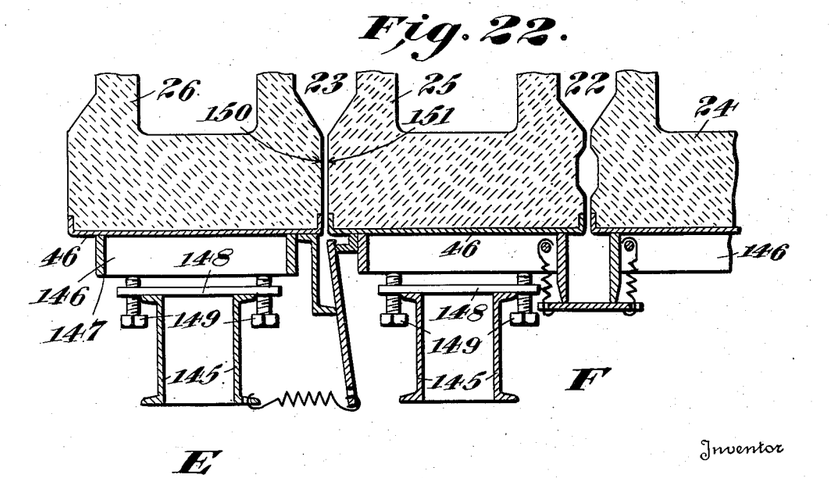

To make certain that deposits of limited thickness will not interfere with the closing of the walls the space left free between the wall surfaces, for instance the surfaces 150 and 151 in Figure 22E, may be made ample for instance one or two inches with the result that coal passes into this space until it is in contact with the side sealing members. The coal then acts as a heat insulator for the sealing members and the important advantage is gained, that, a deposit of perhaps ¼" thickness may be allowed to remain on the opposite faces of the surfaces after they have been scraped without running the risk that this deposit can interfere with the proper closing and sealing of the walls. Moreover, with this arrangement the width of the coking chamber can be reduced or increased to provide a different width, which is of importance, since it enables the plant to deal satisfactorily with coals of different coking characteristics.

By sealing each coking chamber flexibly and by retaining the water in the top troughs during motion of the walls and by permanently connecting the side seals to the top troughs the time taken in breaking and remaking the seals is avoided, and heat losses from the chambers are reduced. The connection between the side seals and the bottom seal although it is interrupted when opening the bottom door is automatically reestablished in gastight manner when closing the door and filling it with water. The bottom doors may also be lowered in a parallel motion, thus retaining their water.

By the use of these sealing devices the number of operating actions to be performed on the seals when discharging and recharging a chamber has been reduced to the removal and reinstallation of the top and bottom doors and a simple form of cleaning, automatically done by motor driven machinery, which simplifications make it possible to operate simultaneously a large number of retorts, making it possible to operate very large coking plants with greatly improved economy in labor and time. The same sealing devices may however be used in small plants for the operation of only one chamber, while the other chambers in the same block remain in service undisturbed. The seals also permit widening and also the narrowing of the chambers during coking operation, without impairment of sealing effect. Furthermore, the seals are such as to permit, to a high degree, a lack of register between the edges of adjacent walls, the gastightness of the seals not being effected by this lack of register. The seals are less expensive than the doors used for other coke ovens and they are absolutely gastight during coking, thereby eliminating losses of by-products and infiltration of air. They are easily kept in good operating condition because they are easily and quickly replaced in case of need.

I claim:

1. In a coking oven with individually sealed coking chambers formed between internally heated walls, which are relatively movable with respect to each other, water sealed top and bottom sealing means, adapted to accommodate the motion of the walls.

2. In a coking oven with individually sealed coking chambers formed between internally heated walls, which are relatively movable with respect to each other, the sealing of each chamber at the top and bottom against the movable walls by means of removable liquid devices.

3. In a coking oven with individually sealed coking chambers formed between internally heated walls, which are relatively movable with respect to each other, a continuous flexible water trough connecting the tops of adjoining movable walls with each other and sealing each chamber, adapted to take part in the spreading motion of the walls, while retaining the water.

4. In a coking oven with individually sealed coking chambers formed between internally heated walls, which are relatively movable with respect to each other, a longitudinal water trough section fastened to the top of each of the two movable walls, said sections at their ends being connected with each other by means of flexible water containing bridging troughs.

5. In a coking oven with individually sealed coking chambers formed between internally heated walls, which are relatively movable with respect to each other, water sealed sealing means, comprising two longitudinal trough-sections fastened to the tops of the two walls, said sections moving with the walls and being connected with each other by flexible watertight bridging troughs, fastened to the ends of the longitudinal trough sections in water tight manner and adapted to retain the sealing water during the motions of said walls.

6. In a coking oven with individually sealed coking chambers formed between internally heated walls, which are relatively movable with respect to each other, a system of continually active sealing devices for sealing the upper opening of said chamber, and flexible side sealing members held in place by tension springs for permanently sealing both sides of said chamber, said top sealing devices being connected in a gastight manner by elastic packing means to said side sealing members.

7. In a coking oven with individually sealed coking chambers formed between internally heated walls, which are relatively movable with respect to each other, a flexible set of sealing troughs for the top opening and a flexible set of sealing members for the sides, both sets connected with each other by flexible and permanently gas tight corner sealing means applied in the corners where said sets meet, all said sealing means adapted to maintain gas tightness, while the distance between the walls is varied.

8. In a coking oven with individually sealed coking chambers formed between internally heated walls, which are relatively movable with respect to each other, flexible top and side sealing devices said devices made gas tight against each other by flexible corner devices, said corner devices, consisting of packing material elastically and continually pressed against both top and side sealing devices.

9. In a coking oven with individually sealed coking chambers formed between internally heated walls, which are relatively movable with respect to each other, flexible top sealing, side sealing and corner sealing devices said corner sealing devices consisting of packing material elastically and continually pressed against said top and side sealing devices by means of external fluid pressure.

10. In a coking oven with individually sealed coking chambers formed between internally heated walls, which are relatively movable with respect to each other, flexible top sealing, side sealing and corner sealing devices and bottom sealing curtains fastened onto the lower surface of each wall, the lowest ends of said side sealing devices extending downward and being in a gastight connection with said bottom sealing curtains said lowest ends of the side sealing devices and of said bottom sealing curtains extending downward into sealing liquid contained in the bottom sealing door.

11. In a coking oven with individually sealed coking chambers formed between internally heated walls, which are relatively movable with respect to each other, continually acting sealing devices surrounding each chamber, said sealing devices being in permanent gastight connection with the walls and with each other, during all phases of the coking operation, and adapted to accommodate the motion of the walls, while maintaining gastightness.

12. In a coking oven with individually sealed coking chambers formed between internally heated walls, which are relatively movable with respect to each other, sealing means comprising a continuous flexible water containing top trough and bottom sealing curtains and flexible side sealing means connected in permanently gas tight manner to the top trough and to the bottom sealing curtains, the top opening of each chamber being closed by a bell shaped cover extending into the water of the top trough, the lower opening being closed by a water containing tub-shaped door, said door being raised to a position where the bottom curtains are sufficiently submerged in the bottom door water.

13. In a coking oven with individually sealed coking chambers formed between internally heated walls, which are relatively movable with respect to each other, the sealing of the top opening by means of a continuous water filled trough in conjunction with a bell shaped cover resting in the trough and the sealing of the bottom opening by a water filled door tub, in conjunction with sealing curtains extending downward into the tub for sealing the sides, the width of said top troughs and said bottom tub being ample and adapted to permit an alteration of the width of the chamber, while the top and bottom doors are in position.

14. In a coking oven with individually sealed coking chambers formed between internally heated walls, which are relatively movable with respect to each other, two longitudinal sealing troughs for sealing the top opening, said troughs being linked by flexible bridging troughs made of material which in itself is flexible, such as corrugated metal or canvas or leather or rubber, so located as to be protected from the heat of the oven, and co-acting flexible diaphragms for sealing the side openings.

15. In a coking oven with individually sealed coking chambers formed between internally heated walls, which are relatively movable with respect to each other, a continuous system of top sealing troughs composed of londitudinal rigid sections and flexible bridging troughs said bridging troughs being connected to said rigid sections by means of quick acting clamping devices.

16. In a coking oven with individually sealed coking chambers formed between internally heated walls, which are relatively movable with respect to each other, a sealing tub at the bottom of each chamber, flexible bridging troughs made of canvas at the top of each chamber, the lower ends of said troughs extending down in form of parallel layers into the water contained in the bottom sealing tub, the water in the bridging troughs in communication with the spaces between said parallel layers, said parallel layers serving as side sealing devices to the chamber.

17. In a coking oven with individually sealed coking chambers formed between internally heated walls, which are relatively movable with respect to each other, water filled top and bottom and side sealing devices said side sealing devices made of a double layer of canvas, a continuous water supply going into the top seal, the surplus water going down between the side seals and the surplus water from these going into the bottom seal, whence it is drained, cleaned and recirculated.

18. In a coking oven with individually sealed coking chambers formed between internally heated walls, which are relatively movable with respect to each other, a continuous ring of flexible permanently gastight sealing devices, adapted to maintain effective gastight sealing condition while the width of each chamber is being altered.

19. In a coking oven with individually sealed coking chambers formed between internally heated walls, which are relatively movable with respect to each other, means for sealing all sides of each chamber said means being adaptable to the varying distance between the walls, and remaining gastight during the motion of the walls.

20. In a coking oven with individually sealed coking chambers formed between internally heated walls, which are relatively movable with respect to each other, the sealing of each chamber by means of water sealed top and bottom doors and flexible side sealing devices.

21. In a coking oven comprising hollow internally heated coking walls, which are relatively movable with respect to each other, each movable wall having flexible supply means for supplying heating gases and flexible outlet means for taking waste gases away, each movable wall being individually surrounded on its narrow outer non-coking faces by an iron framework adapted for firmly holding all parts of said wall in their relative position, and comprising carbonizing chambers sandwiched between said coking walls, said chambers having offtakes for distillate gases each of said chambers having top charging and bottom discharging openings, horizontal sealing means for sealing said openings, said horizontal means consisting of horizontal attached members being attached in gastight manner to the horizontal top and bottom proximate edges of adjoining walls and consisting of removable top and bottom doors, said doors being in gastight contact with said horizontal attached members, flexible vertical side sealing means for flexibly sealing the outermost vertical proximate edges of adjoining coking walls to each other and flexible interconnecting corner sealing means for sealing said horizontal attached sealing means and said vertical sealing means to each other in a gastight manner.

22. In a coking oven comprising hollow internally heated coking walls, which are relatively movable with respect to each other, each movable wall having flexible supply means for supplying heating gases and flexible outlet means for taking waste gases away, each movable wall being individually surrounded on its narrow outer non-coking faces by an iron framework adapted for firmly holding all parts of said wall in their relative position, and comprising carbonizing chambers sandwiched between said coking walls, said chambers having offtakes for distillate gases each of said chambers having top charging and bottom discharging openings, horizontal flexible sealing means for sealing said openings, said horizontal means consisting of longitudinal attached members being attached in gastight manner to the horizontal top and bottom proximate edges of adjoining walls, and moving with the walls and being connected with each other by flexible gastight bridging members, fastened to the ends of said longitudinal members in gastight manner and consisting of removable top and bottom doors, said doors being in gastight contact with said longitudinal attached members and said bridging members, flexible vertical side sealing means for flexibly sealing the outermost vertical proximate edges of adjoining coking walls to each other and flexible interconnecting corner sealing means for flexibly sealing said horizontal sealing means and said vertical sealing means to each other in a gastight manner.

23. In a coking oven comprising hollow internally heated coking walls, which are relatively movable with respect to each other, each movable wall having flexible supply means for supplying heating gases and flexible outlet means for taking waste gases away, each movable wall being individually surrounded on its narrow outer non-coking faces by an iron framework adapted for firmly holding all parts of said wall in their relative position, and comprising carbonizing chambers sandwiched between said coking walls, said chambers having offtakes for distillate gases, each of said chambers having top charging and bottom discharging openings, horizontal flexible sealing means for sealing said openings, said horizontal means consisting of longitudinal attached members being attached in gastight manner to the horizontal top and bottom proximate edges of adjoining walls, and moving with the walls and being connected with each other by flexible gastight bridging members, fastened to the ends of said longitudinal members in gastight manner and consisting of removable top and bottom doors, said doors being in a gastight and flexible contact with said longitudinal and said bridging members, flexible vertical side sealing means for flexibly sealing the outermost vertical proximate edges of adjoining coking walls to each other and flexible interconnecting corner sealing means for flexibly sealing said horizontal sealing means and said vertical sealing means to each other in a gastight manner.

24. In a coking oven comprising hollow internally heated coking walls, which are relatively movable with respect to each other, each movable wall having flexible supply means for supplying heating gases and flexible outlet means for taking waste gases away, each movable wall being individually surrounded on its narrow outer non-coking faces by an iron framework adapted for firmly holding all parts of said wall in their relative position, and comprising carbonizing chambers sandwiched between said coking walls, said chambers having offtakes for distillate gases, each of said chambers having top charging and bottom discharging openings, horizontal flexible sealing means for sealing said openings, said horizontal means consisting of longitudinal attached members being attached in gastight manner to the horizontal top and bottom proximate edges of adjoining walls, and moving with the walls and being connected with each other by flexible gastight bridging members, fastened to the ends of said longitudinal members in gastight manner and consisting of removable top and bottom doors, said doors being in a gastight and flexible contact with said longitudinal and said bridging members, flexible vertical side sealing means for flexibly sealing the outermost vertical proximate edges of adjoining coking walls to each other and flexible interconnecting corner sealing means for flexibly sealing said horizontal sealing means and said vertical sealing means to each other in a gastight manner, said gastight contact between said removable top and bottom doors and said longitudinal attached and said bridging members being flexible and adapted to permit motion of walls during operation, without losing gastightness.

25. In a coking oven comprising hollow internally heated coking walls, which are relatively movable with respect to each other, each movable wall having flexible supply means for supplying heating gases and flexible outlet means for taking waste gases away, each movable wall being individually surrounded on its narrow outer non-coking faces by an iron framework adapted for firmly holding all parts of said wall in their relative position, and comprising carbonizing chambers sandwiched between said coking walls, said chambers having offtakes for distillate gases, each of said chambers having top charging and bottom discharging openings, horizontal flexible sealing means for sealing said openings, said horizontal means consisting of longitudinal attached members being attached in gastight manner to the horizontal top and bottom proximate edges of adjoining walls, and moving with the walls and being connected with each other by flexible gastight bridging members, fastened to the ends of said longitudinal members in gastight manner and consisting of removable top and bottom doors, said doors being in a gastight and flexible contact with said longitudinal and said bridging members, flexible vertical side sealing means for flexibly sealing the outermost vertical proximate edges of adjoining coking walls to each other and flexible interconnecting corner sealing means for flexibly sealing said horizontal sealing means and said vertical sealing means to each other in a gastight manner, said gastight contact between said removable top and bottom doors on the one hand and said longitudinal and said bridging members on the other hand being adapted to be broken and to be restored by merely removing the doors from and thereafter returning them into their position.

26. In a coking oven comprising hollow internally heated coking walls, which are relatively movable with respect to each other, each movable wall having flexible supply means for supplying heating gases and flexible outlet means for taking waste gases away, each movable wall being individually surrounded on its narrow outer non-coking faces by an iron framework adapted for firmly holding all parts of said wall in their relative position, and comprising carbonizing chambers sandwiched between said coking walls, said chambers having offtakes for distillate gases, each of said chambers having top charging and bottom discharging openings, horizontal flexible sealing means for sealing said openings, said horizontal means consisting of longitudinal attached members being attached in gastight manner to the horizontal top and bottom proximate edges of adjoining walls, and moving with the walls and being connected with each other by flexible gastight bridging members, fastened to the ends of said longitudinal members in gastight manner and consisting of removable top and bottom doors, said doors being in a gastight and flexible contact with said longitudinal and said bridging members, flexible vertical side sealing means for flexibly sealing the outermost vertical proximate edges of adjoining coking walls to each other and flexible interconnecting corner sealing means for flexibly sealing said horizontal sealing means and said vertical sealing means to each other in a gastight manner, said gastight contact between said removable top and bottom doors on the one hand and said horizontal flexible sealing means on the other hand adapted to be broken for the purpose of spreading the walls and discharging the coke by merely removing said doors, and thereafter to be restored by merely returning said doors to their position, all other sealing means being flexible and adapted to retain gastight contact with each other and with the walls during said spreading motion.

FRANZ PUENING.